United States Patent
Chu et al.

(10) Patent No.: US 7,023,963 B1
(45) Date of Patent: Apr. 4, 2006

(54) DSL LINE CARD ECHO CANCELER-BASED MECHANISM FOR LOCATING TELECOMMUNICATION LINE FAULT

(75) Inventors: Fred T. Chu, Madison, AL (US); Dennis B. McMahan, Huntsville, AL (US); James Ernest Owen, Huntsville, AL (US); Bradley Dwayne Tidwell, Harvest, AL (US)

(73) Assignee: Adtran, Inc., Huntsville, AL (US)

( * ) Notice: Subject to any disclaimer, the term of this patent is extended or adjusted under 35 U.S.C. 154(b) by 383 days.

(21) Appl. No.: 10/403,321

(22) Filed: Mar. 31, 2003

Related U.S. Application Data

(63) Continuation-in-part of application No. 10/246,368, filed on Sep. 18, 2002, now abandoned.

(51) Int. Cl.
*H04M 1/24* (2006.01)
*H04M 3/08* (2006.01)
*H04M 3/22* (2006.01)

(52) U.S. Cl. .............................. 379/15.05; 379/22.02; 379/22.03; 379/22.04

(58) Field of Classification Search ................ 379/1.01, 379/1.04, 14.01, 22.01–22.05, 27.01–27.03, 379/28, 29.03–29.05, 32.04
See application file for complete search history.

(56) References Cited

U.S. PATENT DOCUMENTS

| | | | |
|---|---|---|---|
| 4,243,959 A | 1/1981 | Duttweiler | 333/166 |
| 4,980,887 A * | 12/1990 | Dively et al. | 714/713 |
| 5,084,865 A | 1/1992 | Koike | 370/32.1 |
| 5,111,497 A * | 5/1992 | Bliven et al. | 379/27.01 |
| 5,244,067 A | 9/1993 | Skotek et al. | 192/125 |
| 5,761,938 A | 6/1998 | College | 72/5 |
| 5,774,316 A | 6/1998 | McGary et al. | 361/42 |
| 6,011,399 A | 1/2000 | Matsumaru et al. | 324/538 |
| 6,480,532 B1 | 11/2002 | Vareljian | 375/222 |
| 6,819,744 B1 * | 11/2004 | Banwell et al. | 379/1.01 |
| 2003/0063711 A1 | 4/2003 | Ginesi et al. | 379/1.01 |

* cited by examiner

*Primary Examiner*—Duc Nguyen
(74) *Attorney, Agent, or Firm*—Allen, Dyer, Doppelt, Milbrath & Gilchrist, P.A.

(57) ABSTRACT

A digital subscriber loop line card-installed mechanism conducts parametric measurements on the wireline to which the line card is connected, and adjusts taps of an echo cancellation operator in accordance with the response of the wireline to an electrical stimulus imparted to the wireline. The echo canceler tap coefficients are then processed to determine the location of a fault, such as a short circuit, open-circuit and the like, on the wireline. Fault information measurement data is then reported to a supervisory control location, which dispatches the appropriate technician to resolve the cause of the problem.

31 Claims, 12 Drawing Sheets

DSL LINE CARD ECHO CANCELER-BASED MECHANISM FOR LOCATING TELECOMMUNICATION LINE FAULT

CROSS-REFERENCE TO RELATED APPLICATION

The present application is a continuation-in-part of U.S. application Ser. No. 10/246,368, filed Sep. 18, 2002, now abandoned entitled: "DSL Line Card Echo Canceler-Based Mechanism for Locating Telecommunication Line Fault," assigned to the assignee of the present application.

FIELD OF THE INVENTION

The present invention relates in general to communication systems, and is particularly directed to a transceiver that is operative to execute a digital echo canceler-based technique for conducting parametric measurements on the wireline to which the transceiver is connected, and determining from measured echo canceler tap data the location of a fault, such as a short circuit, open circuit and the like, on a DSL circuit.

BACKGROUND OF THE INVENTION

With the ongoing expansion of DSL technology, communication services providers have found themselves confronted with the problem that the cost of deployment and maintenance of a DSL circuit may exceed the cost of the DSL equipment itself. A common maintenance issue involves resolving a service-impairing fault that has occurred somewhere along a DSL circuit. To this end, when responding to a DSL trouble call, one or multiple (types of) craftspersons or service technicians may be dispatched to one or more locations along the DSL circuit. For example, a fault occurring within the central office (CO) property will be handled by a CO technician, while a facility technician will be assigned to resolve faults that occur along the cable plant between the central office and the customer site; further, a customer service technician has the responsibility of resolving a problem at the customer premises.

In order to minimize the unwanted expense and delay associated with sending different technicians to different portions of the DSL circuit, it is desirable that the location of the fault be identified prior to dispatching service personnel to correct the problem. Moreover, once a technician has arrived at a potential fault location along the wireline, it may be necessary for the technician to connect and operate expensive test equipment to pinpoint the exact location and type of fault.

Although the telecommunication industry is in the process of developing techniques for detecting types of fault and estimating their location along the DSL circuit, schemes that have been proposed to date are computationally intensive, require dedicated pieces of test equipment and are not readily suited for installation on currently deployed equipment (e.g., DSL line cards).

SUMMARY OF THE INVENTION

The present invention addresses these shortcomings by making use of the digital echo canceler that is resident in the transceiver of a conventional DSL line card, to estimate changes in echo path both upstream and downstream of an apparent line fault. The location of the peak of the echo channel response is correlated directly to the location and the type of the fault. As a non-limiting example, the invention may be used to locate, in prescribed (e.g., 250 ft) increments, an open or short in the tip and ring conductors of a metallic wireline pair up to 7.5 kft away from the central office.

The echo canceler may comprise a linear adaptive finite impulse response (FIR) filter, whose input is coupled to the transceiver's transmitter unit, and the output of which is differentially combined with the output of a receive path of a line interface section between the telecommunication wireline pair the respective transmitter and receiver units of the line card. A least mean squared (LMS) algorithm is used to minimize the error output of the differential combiner. When the echo path is linear, and the number of echo canceler taps exceeds the duration of the impulse response of the echo path, the echo path impulse response can be readily approximated with minimal error. The echo contribution of the line can be estimated using a mathematical approximation of the echo path response.

Transmit filters of the transceiver are coupled to a hybrid function and a line response function, outputs of which are combined and coupled to a receive filter, to produce an approximation of the loop response. Thus, an estimate of the channel response may be derived from the echo canceler with knowledge of the transmit filter response, the received filter response, and the hybrid function. However, even though accurate models of the transmit filter response and the receive filter response can be readily generated, it is difficult to initially determine the hybrid function, since an analog circuit cannot be precisely produced in terms of components and circuit board layout.

In accordance with a first, 'zero reference' embodiment of the invention, to obviate this shortcoming, the hybrid function, per se, is initially estimated, by controllably setting the loop transfer function to zero. For this purpose, a switch (such as contacts of a relay) in the path between the DSL transceiver and the tip and ring conductors of the wireline pair, is initially opened. A first set of echo canceler taps is found when the relay is open. Thereafter, to estimate the echo canceler response when the transceiver is connected to the loop, the relay contacts are closed. The line impulse response is estimated by performing an inverse fast Fourier transform ($FFT^{-1}$) of the frequency response estimate of the line.

If the line contains a fault, the line impulse response will contain a peak (in the time domain) representing the location of the fault. The distance to the fault is determined by measuring the round trip propagation delay of the return signal (echo) and converting the delay to distance. If the fault is an open circuit, the line impulse response will exhibit a positive peak, whereas a short circuit will produce a negative peak. The coefficients of the two sets of echo canceler taps that have been derived for the respective open and closed conditions of the relay may then be encoded into a message that is transmitted to a separate maintenance and testing center computer, to take advantage of increased processing power available at a facility independent of the line card.

Alternatively, a more proximately located processor, such as that contained in a system control unit, installed in a common equipment rack or shelf with the line card, and communicating with the line card via the shelf backplane, may be used to perform the fault location processing. This allows fault location data to be read directly from the line card equipment shelf.

To improve the accuracy of the fault locating process either at a common equipment shelf processor, or at the central office maintenance and testing center processor, the two sets of echo canceler taps may be differentially combined. The frequency response of the differentially combined estimate is divided by the frequency response associated with the set of taps derived with the relay contacts open, to provide a 'normalized' response. The frequency response of the normalized estimate is converted to the time domain, to realize a time domain amplitude response. The time domain response is analyzed to locate the peak, and thereby determine the location and type of fault. Fault location information is then supplied to the dispatch service center, which then identifies the appropriate servicing technician to be sent to the location of the fault along the DSL line.

Although the installation of a relay on the line card facilitates determining the filter shape of a 'baseline' echo-cancellation characteristic, there are times when physically installing a relay on the line card may be costly or not practically possible, e.g., in the case of line cards that are already deployed in the field. In this circumstance fault location may be estimated using a reference echo return routine of a second embodiment of the invention.

In accordance with this alternative scheme, with the line card running normally, the echo canceler taps of the a priori, known to be "good" loop inside the circuitry of the transceiver are stored. If a fault occurs on the loop, an alarm will be transmitted to the test center. The test center operator can then initiate a diagnosis command to the line card, or the line card itself can initiate a diagnosis command as soon as it detects a fault. In either event, the line card's echo canceler retrains at a new line condition. As a result of the retrain operation, there will be two sets of echo canceler taps stored in the transceiver: a first associated with the line prior to the fault, and a second associated with the line frequency response when the wireline contains a fault, i.e. a "bad" line response.

Since the fault response is directly proportional to the difference between a "good" line and a "bad" line, the dependency of the hybrid response is removed by subtracting the two characteristics, and an estimate of the fault impulse response is derived by taking an inverse FFT of the difference. This approach is similar to the first embodiment; however, what is being measured is the difference between the good line and the bad line, rather than the line response itself, and has been shown to have enhanced accuracy over the zero reference embodiment.

In the course of executing the invention to locate loop faults, anomalies such as bridged-taps may impact the measured response, depending on whether the bridged-tap is located closer to the central office than the fault. Where the bridged-tap is beyond the fault, there is no impact on the performance of the loop detection mechanism of the invention, since the loop response at the fault is identical to the loop response without the bridged-tap influence. However, where the fault is beyond the bridged-tap, the return signal or the difference of the return signal is dominated by the bridged-tap. In this case, the fault detection routine will detect the bridged-tap location instead of the fault location, with no additional information to help the algorithm.

If it is known, a priori, that the bridged-tap will always be outside of the central office, then the wireline can still be segmented with respect to fault location. However, the fault location and type estimate will not be as precise as in a non-bridged-tap loop. Measured response characteristics have revealed that when the bridged-tap is located relatively close to the central office (e.g., 500 ft or less), it may not be used for fault location purposes.

For a bridged-tap that is relatively close to the central office, the echo canceller tap difference can be measured; however, the prediction of the fault location will differ from the actual location by the distance from the bridged-tap to the central office. Namely a shorted loop located 3 kft away will be detected as being located in a close-in range of from 250 ft to 0 ft. Therefore, with prior knowledge of the bridged-tap location, measurement data can be calibrated by injecting a prescribed constant to the fault location estimation. Fortunately, most bridge taps on loops encountered in the field are in the vicinity of the remote terminal, so that they are less of a problem statistically.

An open fault in only one of the conductors of the wireline pair is relatively difficult to detect, since it manifests itself as a very large return signal, irrespective of the distance to the fault. Indeed, there is very little differentiation in capacitance distance, when this type of faulty loop is coupled to an LCR meter and the loop capacitance is measured differentially. Although the response characteristic of an open single conductor fault is readily discernible, it is very difficult to identify anything with less than two kft of resolution. To address this problem, the capacitance of the loop may be measured as referenced to ground per conductor. Such a conductor-to-ground measurement can handle this loop fault more effectively than the differential signal sensed by the echo canceler mechanism.

In the course of conducting loop measurements and gathering echo cancellation tap data, foreign DC voltages and power line influences constitute unwanted voltages for proper data signaling. Although these low frequency disturbances will generally not affect normal DSL transceiver operation, they may introduce chronic error problems in the transceiver, if the level of coupling becomes too large. To avoid this problem, the line interface between the transmitter and receiver components of the DSL data pump preferably contains a transformer, a D.C. blocking capacitor and digital filters to filter out unwanted signals. Residual DC and low frequency signals will be rejected by the DC tap of the echo canceler.

Also, the value of the DC tap can be monitored, and a threshold derived to alert the operator of the presence of a foreign power source on the loop. A reference DC tap captured during normal operation (without any error) may be used. As long as the D.C. tap ratio is within this threshold (typically in the range of 2 to 5), the alarm is not triggered.

DETAILED DESCRIPTION

Figure 1:
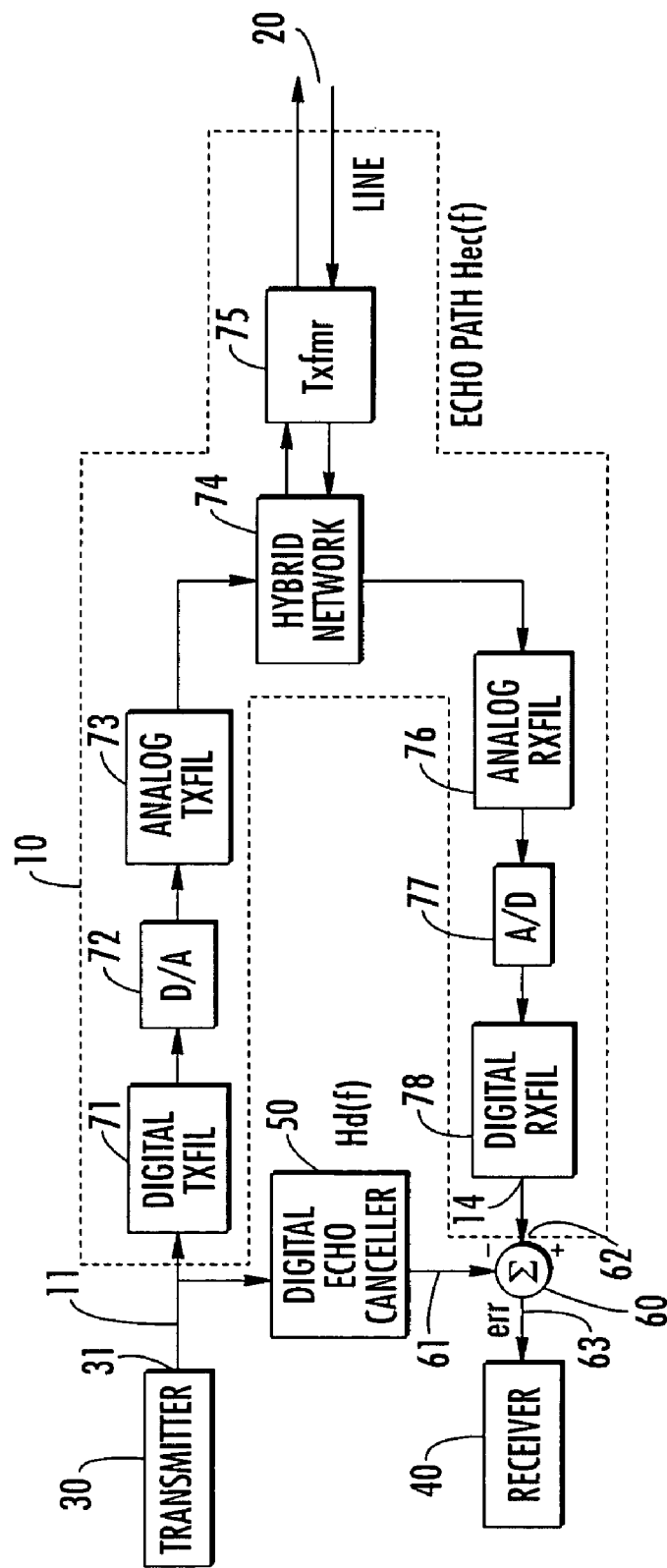
FIG. 1 diagrammatically illustrates a transceiver having a digital echo canceler.

Before detailing the new and improved DSL line card-associated, digital echo-canceler-based fault location mechanism of the present invention, it should be observed that the invention resides primarily in prescribed modular arrangements of conventional communication circuits and associated digital signal processing components and attendant supervisory control circuitry, that controls the operations of such circuits and components. In a practical implementation that facilitates their incorporation into existing printed circuit cards of telecommunication equipment, these modular arrangements may be readily implemented as field programmable gate array (FPGA)-implementation, application specific integrated circuit (ASIC) chip sets, programmable digital signal processors, or general purpose processors.

Consequently, the configuration of such arrangements of circuits and components and the manner in which they are interfaced with other telecommunication equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations are primarily intended to show the major components of the invention in a convenient functional grouping, whereby the present invention may be more readily understood.

As described briefly above, the DSL line card-associated fault location scheme of the present invention takes advantage of the functionality of a digital echo canceler within the data pump or transceiver of a DSL line card, such as but not limited to HDSL, HDSL2 and HDSL4 line cards, to perform channel estimation. As a non-limiting example, such line cards may comprise an H2TUC such as model numbers 1223001L6, 1223003L6 and 1223004L6 manufactured by Adtran Corp, Huntsville, Ala. In its normal operation, the digital echo canceler employed by the transceivers of HDSL, HDSL2 and HDSL4 line cards is configured to remove the return of the transmitted signal from the received signal.

A reduced complexity diagram of a transceiver employing a digital echo canceler used for this purpose is shown in FIG. 1. A line interface section 10 is installed between a telecommunication wireline pair 20, and respective transmitter and receiver units 30 and 40 of the line card. A digital echo canceler 50, such as a linear adaptive finite impulse response (FIR) filter, is coupled between the output 31 of the transmitter unit 30 and a first input 61 of a differential summer 60, to a second input 62 of which a received signal output of the line interface section 10 is coupled.

Within the line interface section 10, a transmit input 11, to which the output of the digital data signal from the transmit unit 30 is applied, is coupled to a digital transmit filter 71. The filtered digital signal is converted into analog signal in digital-to-analog converter (DAC) 72, and the analog transmit signal is then filtered by an analog transmit filter 73 for application to the telecommunication line 20 via a hybrid network 74 and a line-coupling transformer 75. In the receive direction (from the line 20 to the receiver unit 40), a received analog signal from telecommunication line 20 is coupled through transformer 75, hybrid network 74, and applied to an analog receive filter 76. The filtered analog signal is then digitized in analog-to-digital converter (ADC) 77 and coupled through a digital receive filter 78 to the received signal output 14.

With the digital echo canceler 50 implemented as a linear adaptive FIR filter, a least mean squared (LMS) algorithm (or other known adaptive FIR algorithm) is employed to attempt to minimize the error (err) output 63 of the differential summer 60. When the echo path is linear and the number of echo canceler taps exceeds the duration of the impulse response of the echo path, the echo path function Hec(f) can be approximated with the echo canceler Hd(f) with a minimal amount of error.

Figure 2:
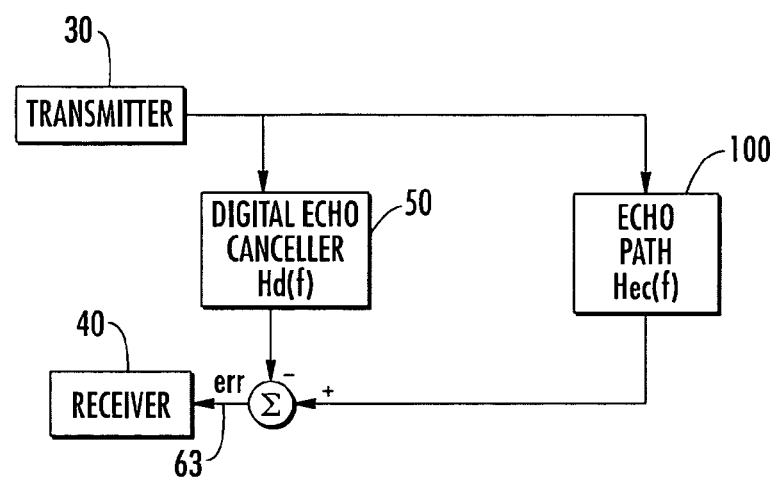
FIG. 2 shows a reduced complexity, correlation cancellation mathematical model of an echo path of the signal transport path of FIG. 1.

FIG. 2 shows a reduced complexity, 'mathematical model' that represents the echo canceler problem of FIG. 1, as a correlation cancellation problem, in which an echo path block 100 corresponds to the line interface 10 of FIG. 1. Ideally, the echo path Hd(f) is approximately equal to the echo path function Hec(f), with the accumulated error (err) approaching zero, when the LMS algorithm of the echo canceler converges. This means that the impulse response of the overall echo path may be readily estimated.

Figure 3:
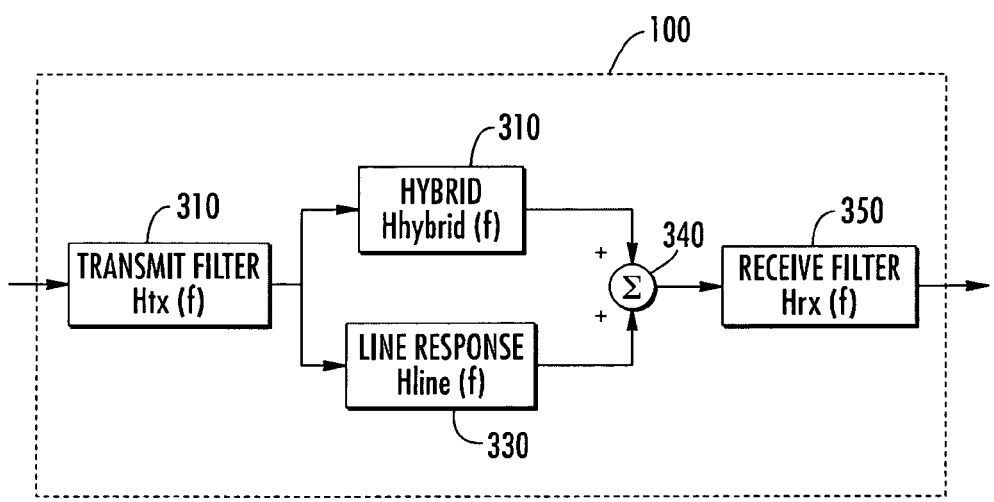
FIG. 3 is a block diagram approximation of the overall echo path response that enables the contribution of a wireline to be estimated.

FIG. 3 is a block diagram approximation of the overall echo path response Hec(f), that enables the contribution of the line 20 to be estimated. As shown therein, the transmit filters of FIG. 1 are shown as a transmit filter function, Htx(f) 310, the output of which is coupled to each of a hybrid function Hhybrid (f) 320 and a Line Response function Hline (f) 330. The outputs of these latter two functions are combined at 340, with the result being coupled to a receive filter function, Hrx(f) 350. The block diagram of FIG. 3 is an approximation of the overall echo path response, since Hhybrid(f) is also a function of Hline(f). As a result, what is produced is an approximation of the loop response, which can be defined in equation (1) as follows.

$$H\text{line}(f) = H\text{ec}(f)/[H\text{tx}(f)*H\text{rx}(f)] - H\text{hybrid}(f) = Hd(f)/[H\text{tx}(f)*H\text{rx}(f)] - H\text{hybrid}(f) \qquad (1)$$

Equation (1) implies that an estimate of the channel response may be derived from the echo canceler with knowledge of Htx(f), Hrx(f) and Hhybrid(f). It is relatively easy to generate an accurate model of the transmit filter response Htx(f) and the received filter response Hrx(f). However, it is difficult to determine Hhybrid(f), due to the fact that a given analog circuit cannot be precisely replicated in terms of components and board layout. With two unknowns (Hhybrid(f) and Hline(f)) and only one equation, this would render the channel estimation method of little use, without being able to separately measure or estimate Hybrid(f).

One way to measure Hhybrid(f) is to set the loop transfer function Hline(f) to zero, i.e. to open tip and ring. This simplifies equation (1) to equation (2) as:

$$Hhybrid(f) = Hd0(f)/[Htx(f)*Hrx(f)] \quad (2)$$

where $Hd0(f)$ is the echo canceler response as measured when the tip and ring are open. Substituting equation (2) into equation (1) produces equation (3) as:

$$Hline(f) = [Hd(f) - Hd0(f)]/Htx(f)*Hrx(f)] \quad (3)$$

Equation (3) reveals that Hhybrid(f) can be estimated by opening the path between the wireline and the transceiver.

Figure 4:
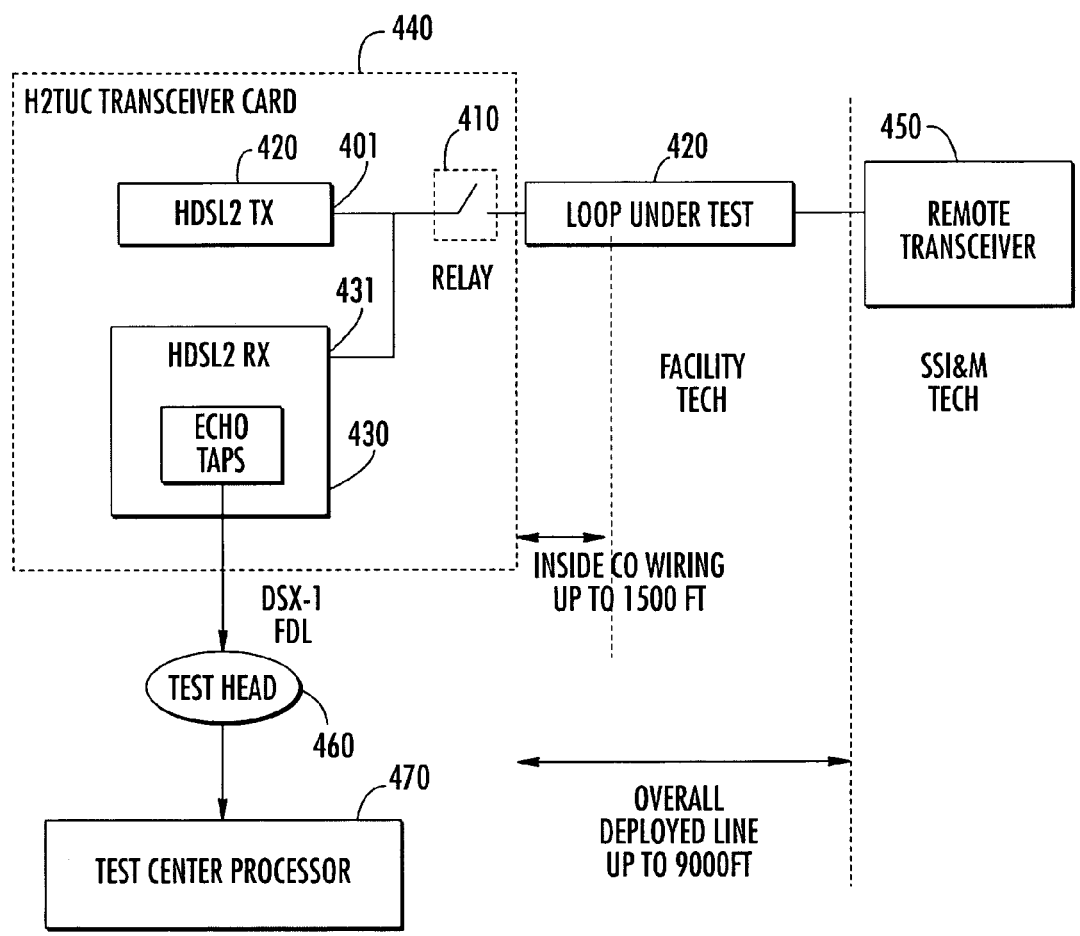
FIG. 4 diagrammatically shows the insertion of a relay between a wireline pair and a DSL line card transceiver.

For this purpose, FIG. 4 diagrammatically shows the insertion of a relay 410 between the wireline (the loop under test(LUT)) 420 serving the remote transceiver 450, and the transmit output 401 of a DSL transmitter 400 and the receive input 431 of a DSL receiver unit 430 within a DSL line card 440. The transceiver is coupled through a test head 460 to a test center processor 470.

The relay 410 is closed to estimate the echo canceler response when the transceiver 440 is connected to the loop. The line impulse response is estimated by performing an inverse fast Fourier transform (FFT$^{-1}$) of the frequency response estimate, in accordance with equation (4) as:

$$hline(t) = FFT^{-1}\{[Hd(f) - Hd0(f)]/[Htx(f)*Hrx(f)]\} \quad (4)$$

If the loop contains a fault, the loop impulse response, hline(t), will contain a peak representative of the location of the fault. The location of the fault is determined by measuring the round trip propagation delay of the return signal (echo) and converting the delay to distance. As a non-limiting example, for an HDSL2 system sampling at 1.034 MSamples/second, each tap delay is approximately equal to one microsecond. With the speed of light being $3 \times 10^8$ m/s and a 0.6 factor for electron propagation within copper, the delay of one tap corresponds approximately to 500 ft round trip distance. This implies that if there is a return signal peak at the tap #10 of the hline(t) estimate, then the wireline distance from the transceiver to the fault is approximately 10*250=2.5 kft. If the fault is an open circuit, the estimate will exhibit a positive peak, whereas a short circuit will produce a negative peak. The type of fault also may be determined by measuring the DC loop current as will be shown when referring to FIG. 20.

Figure 5:
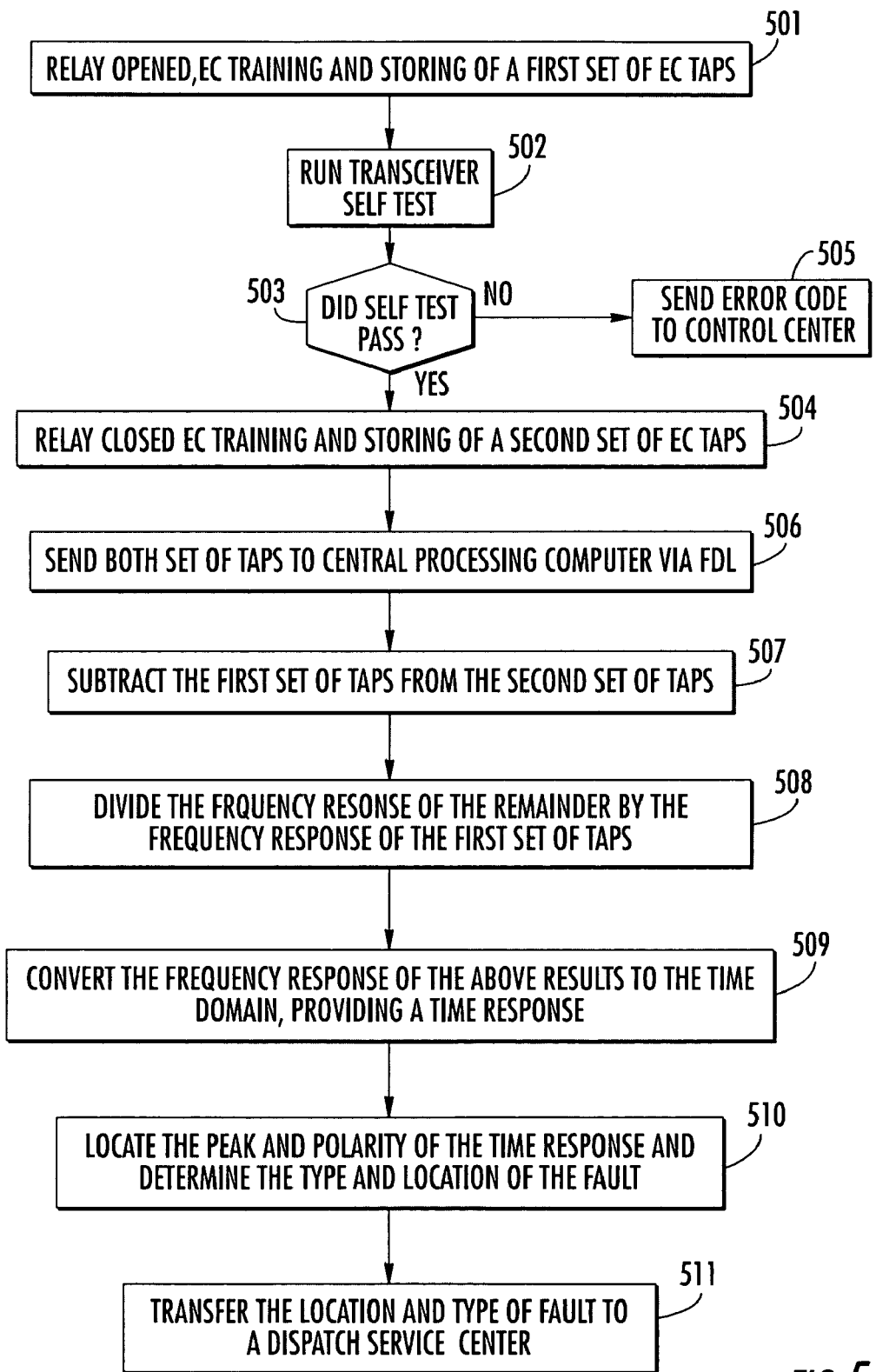
FIG. 5 is a flow chart showing steps of a zero reference-based echo canceler tap training routine in accordance with a first embodiment of the invention.

FIG. 5 is a flow chart of a routine performed by the control processor within the line card that causes the transceiver to transmit a wideband signal downstream toward a cable fault, and allows the taps of an echo-canceler (such as tapped delay line using least means squared (LMS) adaptation) to converge on the signal reflected back upstream from the fault. The shape of the echo-canceler taps is then analyzed to determine the type and location of the fault. As pointed out above, because the components of the analog front end of the DSL transceiver unit can be expected to vary slightly from circuit to circuit, the DSL's front end will, in turn, have a varying effect on the reflection of the transmitted signal. In order to establish the filter shape of a 'baseline' echo-cancellation characteristic, the wideband signal is initially transmitted from the line card transceiver into an open circuit (contacts of relay 410 open).

For this purpose, as shown at step 501, the contacts of the relay 410 between the line card's DSL transceiver units and the wireline 20 are initially opened, and a first set (#1) of echo-canceler taps are stored. Next, in step 502, a self-test of the transceiver is executed. In query step 503 a determination is made as to whether the transceiver has passed the self test. If so (the answer to query step 503 is YES), the routine transitions to step 504. However, if the self test fails (the answer to query step 503 is NO), the routine transitions to step 505, which sends an error code to terminate the measurement operation, indicating there is a problem with the transceiver itself. (For purposes of the present example, it will be assumed that the transceiver is fully operational, so the answer to query step 503 is YES,)

Next, in step 504, the relay contacts 410 are closed, which allows the taps (a second set (#2) of taps) of the echo-canceler to train up on the basis of the characteristics of the wireline fault. Once the second set of taps is determined in step 504, the process transitions to step 506 in which both the first set (#1) and the second set (#2) are transmitted to a maintenance and testing center computer. Sending the tap coefficients to an external processor takes advantage of the considerably greater processing power that is available at facility separate from the line card, such as the central office maintenance and testing center.

Figure 21:
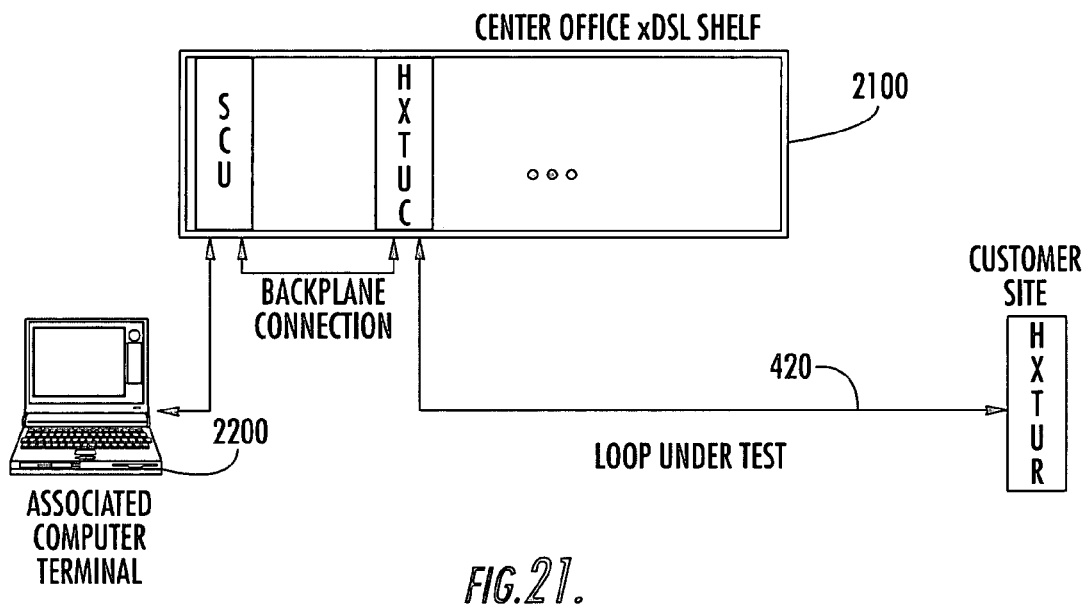
FIG. 21 diagrammatically illustrates a central office transceiver and associated processor housed in a common equipment shelf.

Alternatively, as shown in FIG. 21, a more proximately located processor, such as that contained in a system control unit (SCU) installed in a common equipment rack or shelf with the line card HTXU, and communicating with the line card via the shelf backplane 2100, may be used to perform the fault location processing. This allows fault location data to be read directly from the line card equipment shelf to an associated computer terminal 2110.

In order to improve the accuracy of the fault isolation process either at the common equipment shelf processor, or at the off card site (central office maintenance and testing center processor), the two sets of echo canceler taps are differentially combined in step 507. Next, in step 508, the frequency response of the difference is divided by the frequency response associated with the first set of taps (#1) to provide a 'normalized' response. Next, in step 509, the frequency response of the normalized echo canceler is converted to the time domain, to provide a time domain amplitude response of the type shown in FIGS. 10, 11 and 12, to be described. This time domain response is then analyzed in step 510 to locate the peak, and thereby determine the location and type of fault. In step 511, fault location information is supplied to the dispatch service center, which then identifies the appropriate servicing technician to be sent to the location of the fault along the DSL cable plant. As described above, the ability of the fault detection mechanism of the invention to identify the fault location in terms of segments of the wireline enables the testing center to dispatch the correct technician to the correct fault, reducing maintenance cost and down time, so as to improve quality of service.

Although the use of a relay as described above facilitates determining the filter shape of a 'baseline' echo-cancellation characteristic, there are times when installing a relay on the line card may be costly or not physically possible, e.g., for line cards that are already in the field. In this circumstance fault location may be estimated using the reference echo return routine shown in the flow chart of FIG. 6.

As shown therein, at an initial training step 601, with the line card running normally, the echo canceler taps Hgd(f) of the "good" loop inside the transceiver are stored. When a fault occurs on the loop, e.g., due to human error (such as an accidental cable cut) or natural disaster (e.g., lightning strike), an alarm will be transmitted back to the test center. In response to this alarm, in step 602, the line card initiates a rigorous self-test and, in step 603, transmits a self-test response to its associated host control processor, as may be installed in a common equipment shelf, or at the test center. For purposes of the present example, it will be assumed that the line card has passed the self-test (the fault problem is external, as described above), causing a 'pass' message to be returned to the host control processor in step 603.

The test center operator can initiate a diagnosis command to the transceiver line card, or the transceiver line card itself can initiate a diagnosis command as soon as it detects a link outage.

Figure 6:
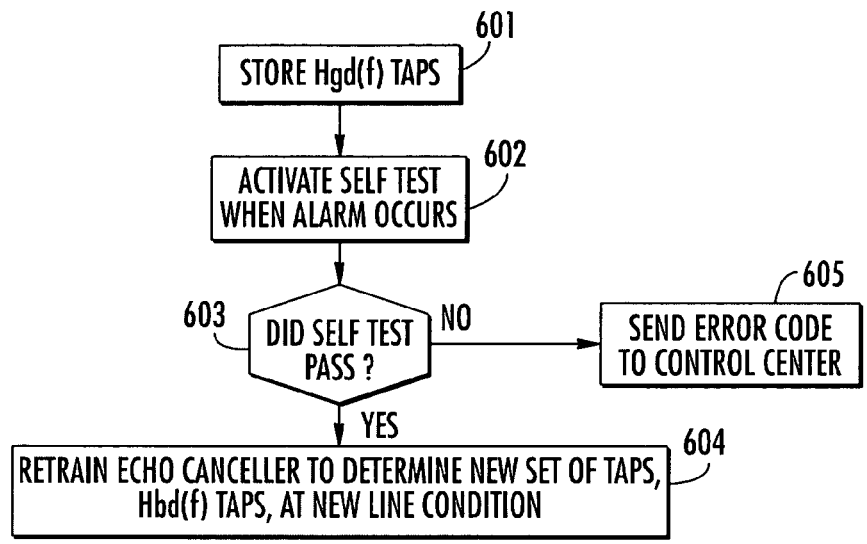
FIG. 6 is flow chart showing steps of a reference echo return-based echo canceler tap training routine in accordance with a second embodiment of the invention.
Figure 22:
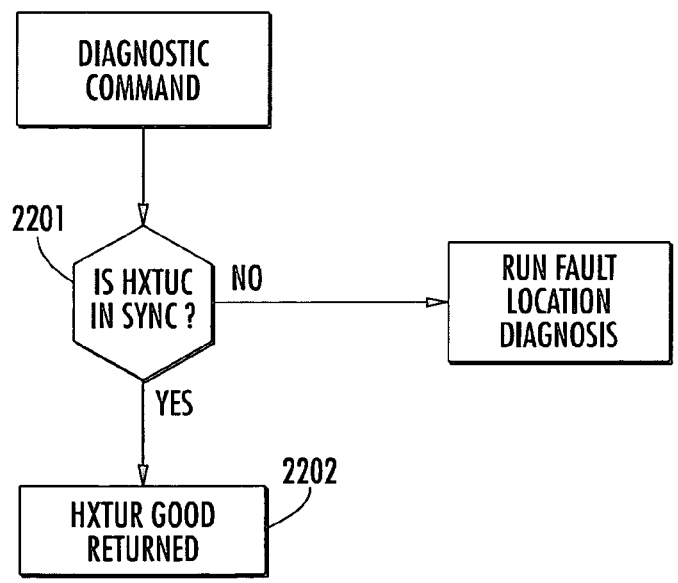
FIG. 22 is a flow chart of a precursor routine to prevent inadvertent take down of an operative wireline.

Because the fault location mechanism of the present invention is intrusive (i.e. it takes the line down), it is important that the line under test is not erroneously identified as a faulty line. For example, as described above, the echo-canceler-based line diagnosis routine of the invention may be initiated on the basis of an alarm received at the test center. In order to prevent test center personnel from inadvertently testing a good line, a pre-cursor "in-sync" test, shown in the flow chart of FIG. 22 is preferably executed, prior to issuing a diagnosis command to the line card. In accordance with this precursor test, when a fault location command is initially asserted, the central office line card's communication path with the remote unite transceiver is examined in step 2201 to determine whether they are appropriately synchronized (in-sync). If the answer to query step 2201 is YES, a 'good return' indication is generated in step 2202, and running of the fault location diagnosis routine is not initiated. However, if the answer to query step 2201 is NO, indicating the presence of a fault in the line under test, the routine proceeds as shown in FIG. 6, or as in FIG. 5, described above.

In response to a diagnosis command, in step 604 the echo canceler retrains at a new line condition. As a result of the retrain operation, there will be two sets of echo canceler taps stored in the central office transceiver shown in equations (5) and (6).

$$Hgline(f) = Hgd(f)/[Htx(f)*Hrx(f)] - Hhybrid(f) \quad (5)$$

$$Hbline(f) = Hbd(f)/[Htx(f)*Hrx(f)] - Hhybrid(f) \quad (6)$$

Here Hbline(f) is the line frequency response when the wireline contains a fault, i.e. a "bad" line response. Hgd(f) and Hbd(f) are the echo canceler frequency response as measured when the line is in a normal state, and a fault condition, respectively.

Since the fault response is directly proportional to the difference between a "good" line and a "bad" line, the dependency of Hybrid(f) is estimated by subtracting equation (5) from equation (6), as shown in equation (7).

$$Hbline(f) - Hgline(f) = Hfault(f) = [Hbd(f) - Hgd(f)]/[Htx(f)*Hrx(f)] \quad (7)$$

An estimate of the fault impulse response hfault(f) is derived by taking the $FFT^{-1}$ of equation (7). Namely, $$hfault(t) = FFT^{-1}\{[Hbd(f) - Hgd(f)]/[Htx(f)*Hrx(f)]\} \quad (8)$$

Equation (8) is very similar to equation (4). What is being measured is the difference between the good line and the bad line, rather than the line response itself. From a practical standpoint, this differential method has proven to be more accurate than the zero reference method described previously.

The fault location algorithm is simplified if the denominator of equation (8) is set equal to one. Such a simplification is equivalent to assuming that the contribution to the time response from the transmit filter and the receive filter is negligible. Equation (8) then becomes:

$$hfault(t) = k*hbd(t) - hgd(t) \quad (9)$$

where k is the gain ratio of the AGC (automatic gain control) gain setting of the line in a fault diagnostic mode and the AGC gain setting of the line in healthy (good) condition. The simplified algorithm of Equation (9) does not have spectral estimation error due to FFT calculations of the front-end filters. Further it has been shown in simulations that the simplified algorithm has a better fault detection accuracy in the bridged-tap loops than algorithms using the inverse FFT.

Figure 7:
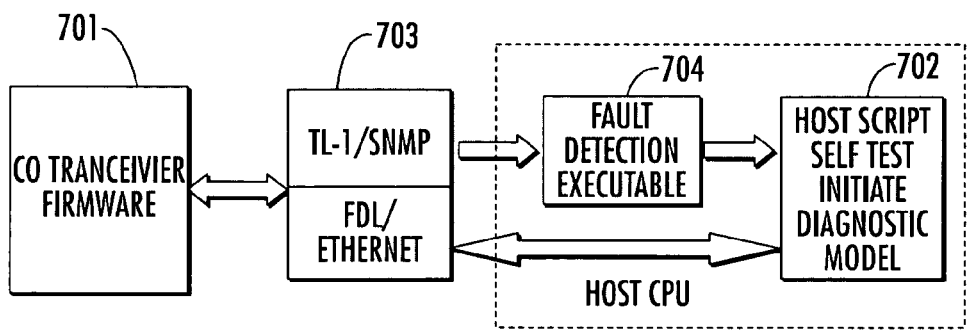
FIG. 7 is a block diagram of the integration of software routines resident in various platforms of a DSL telecommunication system.
Figure 8:
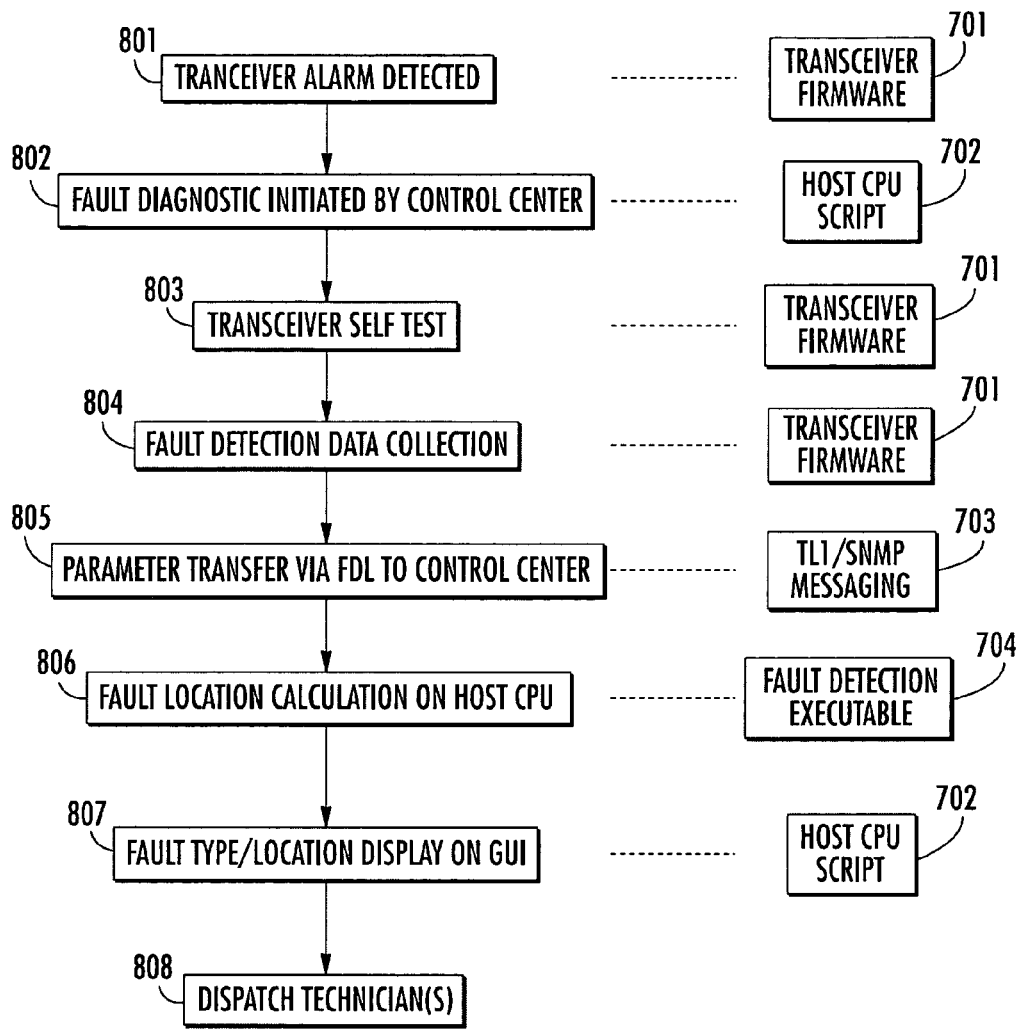
FIG. 8 is a time line flow chart associated with the integration block diagram of FIG. 7.

FIG. 7 is a block diagram of the integration of software routines resident in different platforms of a telecommunication system to implement a comprehensive testing strategy for solving the loop fault detection problem, and a time line for these software/firmware interactions is shown in the flow chart of FIG. 8. As shown at step 801 of FIG. 8, an initial alarm is generated for the line card, when a loop fault is detected by the line card's firmware 701. Following the alarm, at step 802, a fault diagnostic routine is initiated by (the host processor 702 within) the control center or by an SCU processor. Next, in step 803, the line card's firmware 701 initiates a self-test. Upon completion of the self-test, the line card's firmware 701 collects and stores fault detection data in step 804. In step 805, using a messaging routine 703, such as TL-1, simple network management protocol (SNMP), Facility Data Link (FDL) and Ethernet, the data collected by the line card is forwarded to the host processor. Alternatively, where the host processor is installed in the same equipment shelf as the line card, the data collected by the line card may be forwarded by the line card via the back plane; a separate messaging routine, as the use of an FDL orderwire, is not required. In step 806, using a fault location algorithm 704, the host computer processes the fault detection data to locate the fault and, it step 807, displays the fault type/location on a graphic user interface (GUI) within the central test center. Finally, having located the fault, a craftsperson is dispatched in step 808.

Simulation Results

Figure 9:
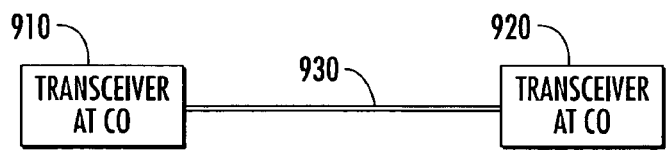
FIG. 9 shows a pair of DSL transceivers connected by a wireline pair subject to a loop fault.

FIG. 9 shows a pair of HDSL2 transceivers 910 and 920 connected by a wireline pair 930 that is subject to a loop fault under various conditions.

Figure 10:
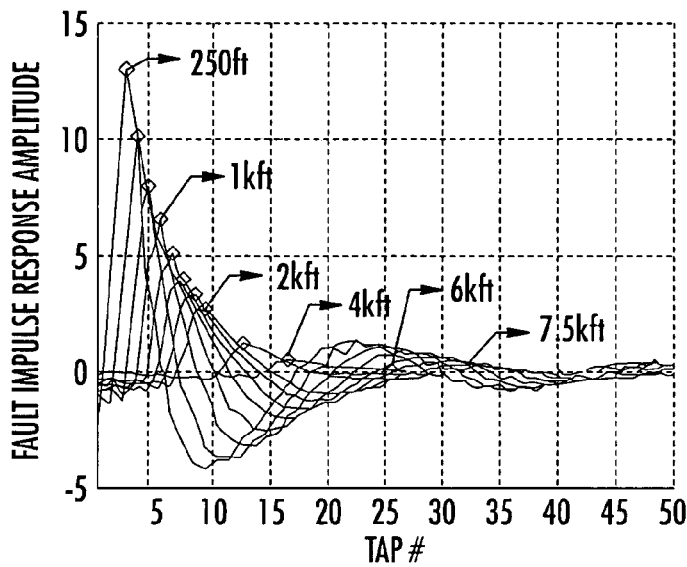
FIGS. 10 and 11 show respective amplitude vs. tap number/distance characteristics of an FIR filter for an open and a short conductor loop fault over a range of from 250 ft to 7.5 kft.
Figure 11:
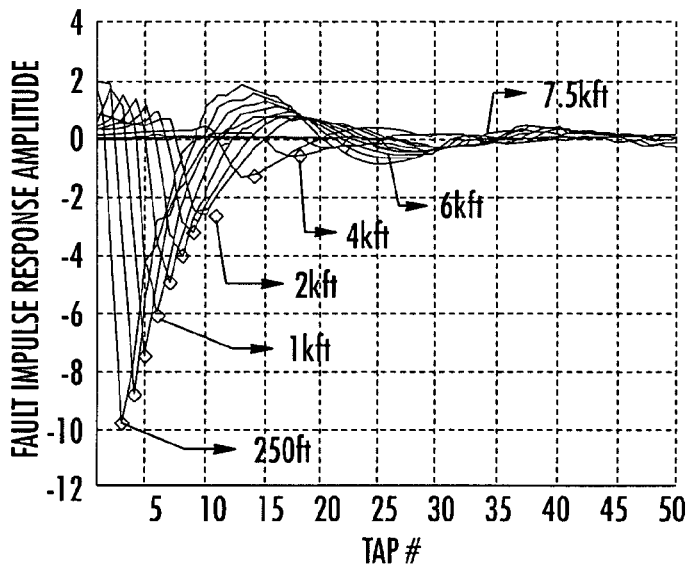

FIGS. 10 and 11 respectively show the amplitude vs. tap number/distance characteristics of the FIR filter for an open and a short conductor loop fault over a range of from 250 ft to 7.5 kft. In each of the FIR characteristics of FIGS. 10 and 11, the positive peak of the fault impulse response corresponds to the distance to the fault. As can be seen from the Figures, as distance increases, the amplitude eventually decreases to the point where the estimation noise (due to processing limitations and other imperfections) exceeds the peak generated by the fault. This means that the fault location is beyond detection range. From the plotted data, maximum detection range is on the order of 7.5 kft for an open conductor loop.

Figure 12:
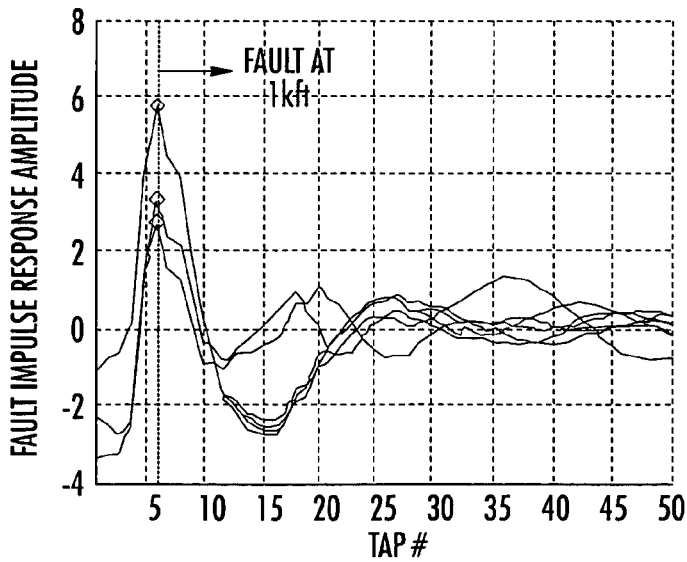
FIG. 12 shows the response for an open circuit fault at one kft with the reference loop length varying from 9 kft to 4 kft.

FIG. 12 shows the response for an open circuit fault at 1 kft with the reference loop length (the separation distance between the two transceivers of FIG. 9, when the loop is working properly) varying from 9 kft down to 4 kft. This reference length may be shortened or lengthened with very little impact on the fault location estimation. The only change is the relative size of the detected peak amplitude, as a result of the different sizes of the reference echo response.

Figure 13:
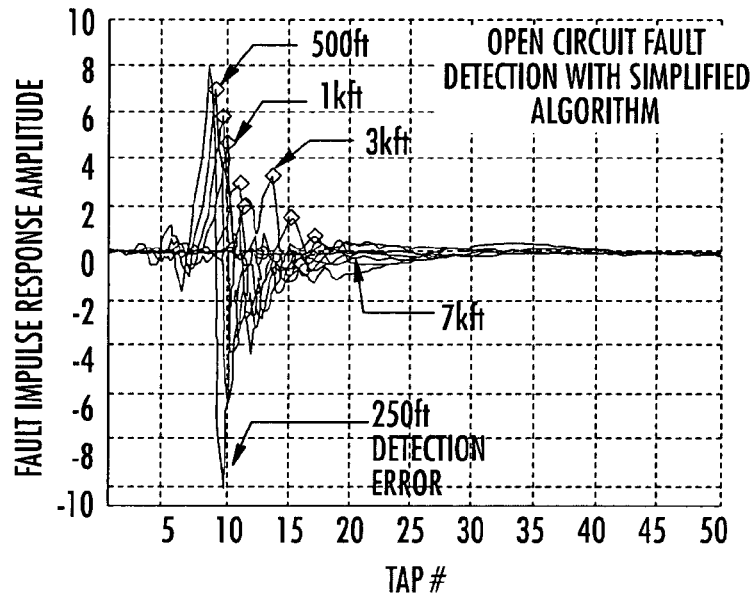
FIG. 13 shows amplitude vs. tap number/distance for an open circuit fault using a simplified algorithm.

FIG. 13 shows the amplitude vs. tap numbers/distance characteristics of the line for open circuit faults at distance between 250 ft and 7 kft using the simplified algorithm. Note that there is an offset of 15 taps due to the characteristics of the transmit and receiver filters. A false reading using the simplified algorithm occurs at short distance, such as shown by the negative peak for the 250 ft detection. Such false readings may be detected by using DC measurement techniques, as will be discussed later.

Figure 14:
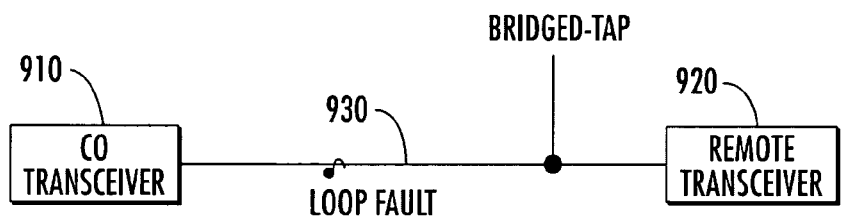
FIG. 14 shows a loop containing a fault located closer to the central office than a bridged tap.
Figure 15:
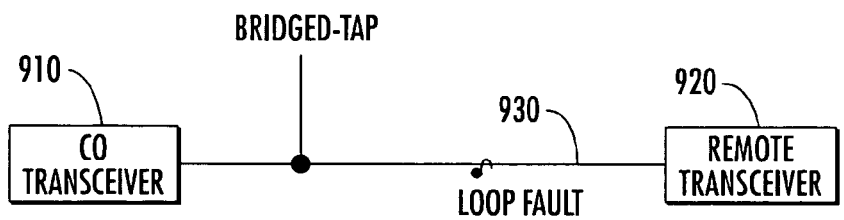
FIG. 15 shows a loop containing a fault located beyond a bridged-tap.

When considering loop anomalies such as bridged-tap loops with faults, there are two possibilities: 1) the fault is located closer to the central office than the bridged tap, as diagrammatically illustrated in FIG. 14; and 2) the fault is beyond the bridged-tap location, as diagrammatically illustrated in FIG. 15. In the case 1, there is no impact on the performance of the loop detection algorithm described above, since the loop response at the fault is identical to the one without the bridged-tap influence. As a consequence, the results described above can be applied directly to the first case.

However, where the fault is beyond the bridged tap, the return signal or the difference of the return signal is dominated by the bridged-tap. In this case, the fault detection routine described above will detect the bridged-tap location instead of the fault location, with no additional information to help the algorithm. If it is known a priori that the bridged-tap will always be outside of the central office, then the wireline can still be segmented with respect to fault location. However, the fault location and type estimate is not as useful as in a non-bridged-tap loop.

Figure 16:
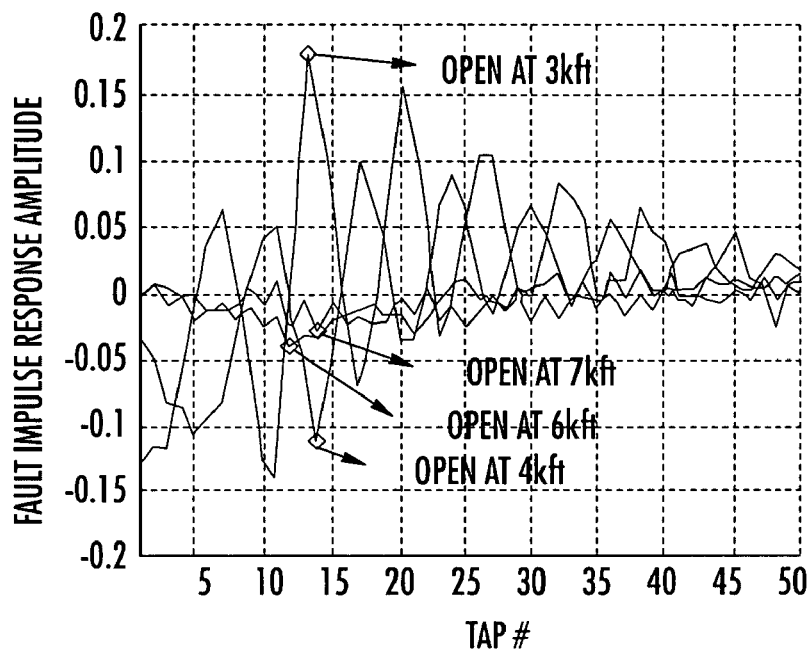
FIG. 16 is a loop response characteristic showing loop faults beyond a bridged-tap.
Figure 17:
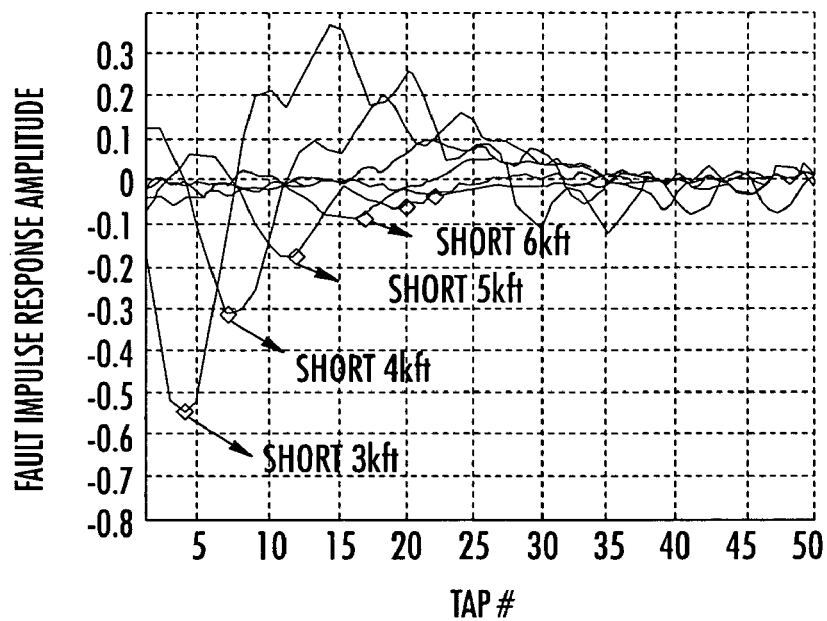
FIG. 17 shows a loop response characteristic with a 500 ft. bridged-tap 3000 ft. away from the central office.

The response characteristic of FIG. 16 shows loop faults located beyond a bridged-tap denoted as loop faults at locations of the bridged-taps, but with sign inversion, so that the fault detection algorithm effectively becomes a bridged-tap detection algorithm. When the bridged-tap is located relatively close to the central office (e.g., 500 ft or less), it may be used for fault location purposes. For a relatively close bridged-tap, the difference can be measured; however, the location prediction is off by the distance from the bridged-tap to the central office. Namely a shorted loop located 3 kft away, as shown in FIG. 17, will be detected as being located in a range of from 250 ft to 0 ft. As a result, with prior knowledge of the bridged-tap location, measurement data can be calibrated by applying a prescribed constant to the fault location estimation. Thus, when an unknown bridged-tap is present on the loop, the measurement data will be less accurate. In reality, most bridge taps on loops encountered in the field are in the vicinity of the remote terminal, so that they are less of a problem statistically.

Figure 18:
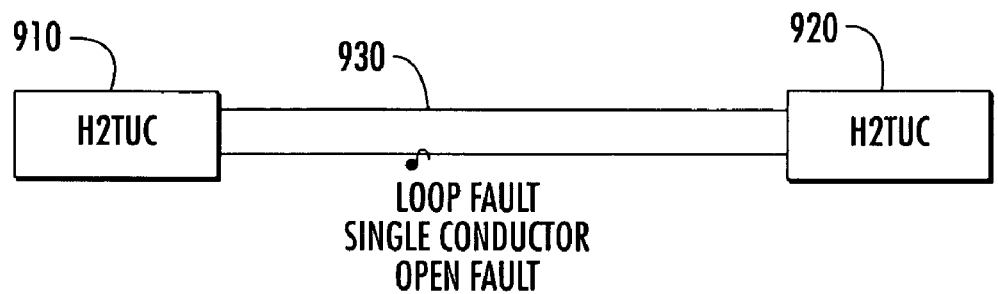
FIG. 18 diagrammatically illustrates an open fault in one of the conductors of the wireline pair of FIG. 9.

FIG. 18 diagrammatically illustrates the case of an open fault in one of the conductors of the wireline pair of FIG. 9. This type of fault is relatively difficult to detect, because it manifests itself as a very large return signal, irrespective of the distance to the fault.

Figure 19:
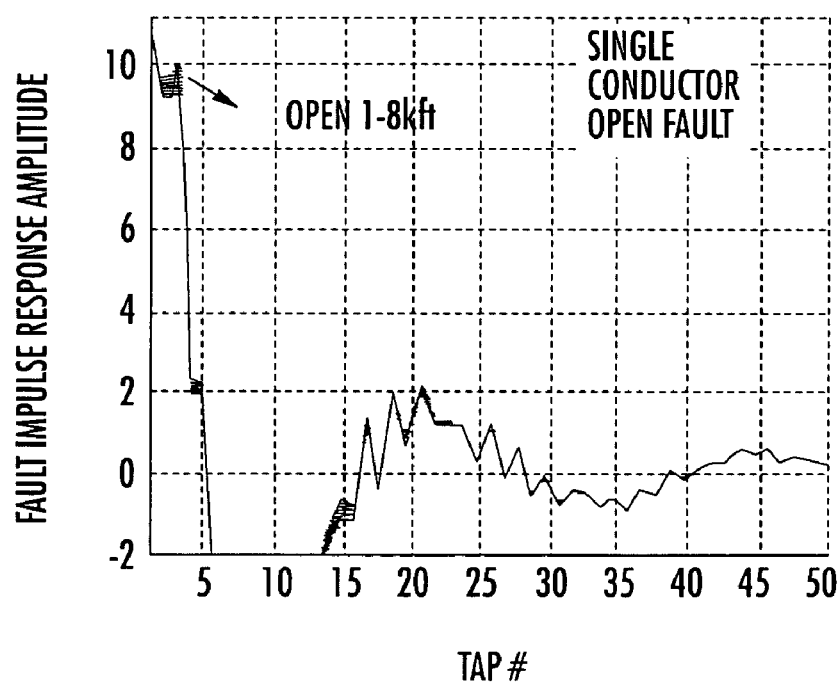
FIG. 19 is a response characteristic showing the "signature" of an open single conductor fault.

There is very little differentiation in capacitance distance, when this type of loop is coupled to an LCR meter and the loop capacitance is measured differentially. As can be seen from the response characteristic of FIG. 19, although the "signature" of an open single conductor fault can be recognized, it is very difficult to identify anything less than 2 kft of resolution. As a result, although the fault can be detected and perhaps generally segmented in terms of wireline distance, the exact location of the single conductor fault is not readily apparent using the technique described above. To circumvent this problem, the capacitance of the loop may be measured as referenced to ground per conductor. Such a "conductor-to-ground" measurement can handle this loop fault more effectively than the differential signal sensed by the echo canceler, described above.

In the course of conducting loop measurements and gathering echo cancellation tap data, as described above, foreign DC voltages and power line influences may couple various unwanted voltages into the data signaling path. In most cases, these low frequency disturbances will not affect normal data pump operation. However, they may introduce chronic error problems in the transceiver if the level of coupling becomes too large. To avoid this potential problem, coupling to the line is preferably implemented by means of a transformer and a D.C. blocking capacitor and other digital filters, shown in FIG. 1, described above, to filter out most of these unwanted signals. The residual DC and low frequency signals will be rejected by the DC tap of the echo canceler. By monitoring the value of the DC tap, a threshold can be derived to alert the operator of the presence of a suspicious foreign power on the loop. Typically a reference DC tap captured during normal operation (without any error) is used. As long as the D.C. tap ratio (DCR) is within this threshold (typically in the range of 2 to 5), the alarm will not be triggered. The DCR may be defined in equation (10) as:

$$DCR = CurrentDCTap/InitialDCTap \qquad (10)$$

As will be appreciated from the foregoing description, the digital echo canceler-based fault location mechanism of the invention provides a very effective and low cost mechanism for locating within which segment of a wireline pair a fault has occurred. By locating the peak of a return signal, the invention is able to directly correlate measured echo channel data to the location of the fault. The fault information measurement data is reported to a supervisory control location, which dispatches the appropriate technician to resolve the problem.

Figure 20:
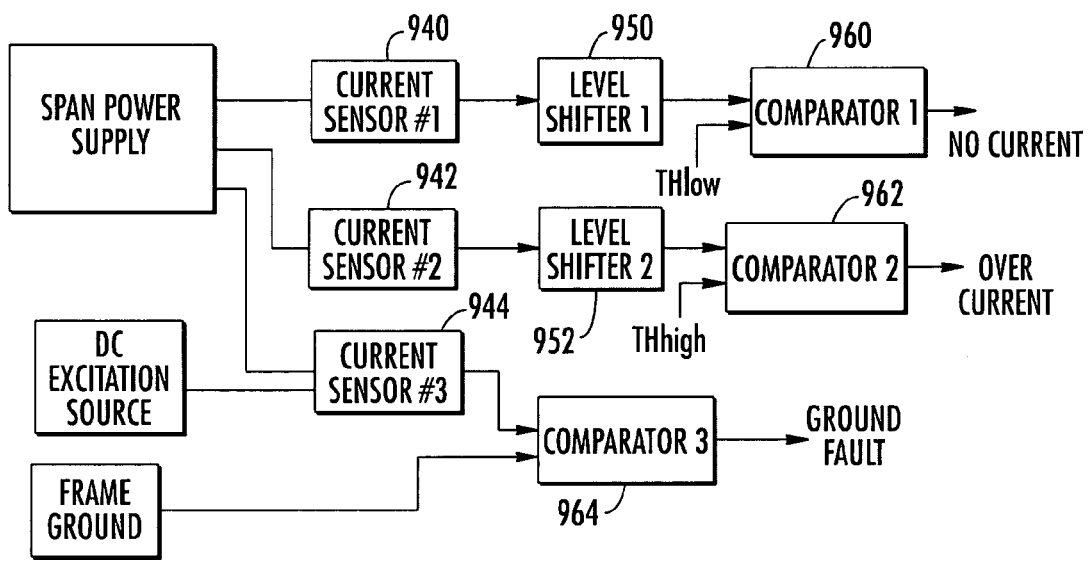
FIG. 20 is a block diagram of a fault detection apparatus based on DC current flow.

FIG. 20 is a block diagram of a DC technique for determining three types of faults, an open, a short and a ground fault. Current sensors 940, 942, 944 determine the DC current level in the wirepair. Level shifters 950, 952 may be amplifiers that are used to increase the dynamic range of comparators 960, 962. If a low current is flowing in the wirepair, representing an open circuit, a logic level of 1 would occur on the output of comparator 1 (the current is less than Thlow). If the current was larger than an expected value, current sensor 2, 942 would cause a logic 1 to occur representing a short circuit. To determine if a ground fault had occurred, current sensor 3's 944 output and the ground frame potential are applied to comparator 3, 964. Details of ground fault detection techniques used in this mechanism may be found in U.S. Pat. No. 5,774,316 assigned to the assignee of this application. The logic outputs of comparators 1, 2 and 3 may be transferred to a central computer and used in conjunction with the findings of the above described line impulse response fault location techniques.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

The invention claimed is:

1. A method of determining the location of a fault along a wireline, serving digital subscriber equipment at a location remote with respect to a central office facility, said location of said fault being determined relative to a DSL line card installed in said central office facility, said method comprising the steps of:
   (a) applying a line card electrical stimulus to said wireline from said central office facility;
   (b) at said DSL line card, measuring a response of said wireline to said electrical stimulus applied in step (a), and generating an output from which the distance from said DSL line card to said fault is determined; and
   (c) processing said output generated by said DSL line card in step (b) to determine in which portion of said wireline said fault is located; and wherein
   step (b) comprises establishing attributes of a digital echo canceler, and
   step (c) comprises analyzing attributes of said digital echo canceler to derive a measure of distance from said DSL line card to said fault.

2. The method according to claim 1, further including the step (d) of identifying whether said fault is located within said central office facility, between said central office facility and said remote location, or within said remote location, and generating a message that associates a service technician appropriate for the identified location.

3. The method according to claim 1, wherein step (c) comprises processing said output generated by said DSL line card in step (b) to a measure of distance from said DSL line card to said fault.

4. The method according to claim 1, wherein said fault comprises an open circuit.

5. The method according to claim 1, wherein said fault comprises a short circuit.

6. The method according to claim 1, wherein step (b) comprises transmitting from said DSL line card, to a location separate from said DSL line card, a message representative of said output associated with said response of said wireline to said electrical stimulus, and wherein step (c) comprises processing information contained in said message at said location separate from said line card, to determine in which portion of said wireline said fault is located.

7. A method of determining the location of a fault along a wireline, serving digital subscriber equipment at a location remote with respect to a central office facility, said location of said fault being determined relative to a line card installed in said central office facility, said method comprising the steps of:
   (a) applying a line card electrical stimulus to said wireline from said central office facility;
   (b) at said line card, measuring a response of said wireline to said electrical stimulus applied in step (a), and generating an output from which the distance from said DSL line card to said fault may be determined; and
   c) processing said output generated by said DSL line card in step (b) to determine in which portion of said wireline said fault is located, and wherein
   step (a) comprises applying a wideband signal to said wireline from said DSL line card, and step (b) comprises generating coefficients of an echo cancellation operator in accordance with the measured reflection response of said wireline to said wideband signal, and generating an output representative of said coefficients of said echo cancellation operator.

8. The method according to claim 7, wherein step (a) comprises the preliminary step of opening the connection between said DSL line card and said wireline and generating a first set of tap coefficients of said echo cancellation operator in accordance with the measured reflection response to said wideband signal applied to said open wireline, and thereafter closing the connection between said DSL line card and said wireline and generating a second set of tap coefficients of said echo cancellation operator in accordance with the measured reflection response of said wideband signal to said closed wireline, and step (c) comprises processing said first and second sets of tap coefficients to determine in which portion of said wireline said fault is located.

9. The method according to claim 8, wherein step (c) includes combining said first and second sets of tap coefficients of said echo cancellation operator in a manner that produces a time-domain amplitude response, and determining in which portion of said wireline said fault is located in accordance with the peak of said time-domain amplitude response.

10. The method according to claim 7, wherein step (a) comprises generating a first set of tap coefficients of said echo cancellation operator in accordance with the measured reflection response of said wireline to said wideband signal for a no fault condition of said wireline, and thereafter generating a second set of tap coefficients of said echo cancellation operator in accordance with the measured reflection response of said wideband signal for a fault condition of said wireline, and step (c) comprises processing said first and second sets of tap coefficients to determine in which portion of said wireline said fault is located.

11. The method according to claim 9, wherein step (c) includes combining said first and second sets of tap coefficients of said echo cancellation operator in a manner that produces a time-domain amplitude response, and determining in which portion of said wireline said fault is located in accordance with the peak of said time-domain amplitude response.

12. The method according to claim 1, wherein step (c) includes adjusting a determination of in which portion of said wireline said fault is located, in accordance with a known location of a bridged-tap in said wireline.

13. The method according to claim 1, wherein step (b) includes compensating for unwanted voltage influences on said wireline.

14. An arrangement for determining the location of a fault along a wireline serving digital subscriber equipment at a location remote with respect to a central office facility, said location of said fault being determined relative to a DSL line card installed in said central office facility, comprising:
   an electrical stimulus generator within said central office facility;
   a line card measurement unit installed in said DSL line card, which is operative to measure a response of said wireline to said electrical stimulus, and to generate an output representative of in which portion of said wireline said fault is located; and
   a processing unit that is operative to process said output generated by said line card measurement unit to derive a measure of distance from said DSL line card to said fault; and wherein
   said electrical stimulus generator is operative to apply a wideband signal to said wireline from said DSL line card, and said DSL line card measurement unit is operative to generate coefficients of an echo cancellation operator in accordance with the measured reflection response of said wireline to said wideband signal, and generate an output representative of said coefficients of said echo cancellation operator.

15. The arrangement according to claim 14, wherein said processing unit is operative to determine whether said fault is located within said central office facility, between said central office facility and said remote location, or within said remote location, and generating a message that associates a service technician appropriate for the identified location.

16. The arrangement according to claim 14, wherein said DSL line card measurement unit includes a digital echo canceler having attributes established in accordance with said response of said wireline to said electrical stimulus.

17. The arrangement according to claim 14, wherein said fault comprises an open circuit.

18. The arrangement according to claim 14, wherein said fault comprises a short circuit.

19. The arrangement according to claim 14, wherein said DSL line card measurement unit is operative to transmit to said processing unit at a location separate from said DSL line card, a message representative of said output associated with said response of said wireline to said electrical stimulus, and wherein said processing unit is operative to process information contained in said message to determine in which portion of said wireline said fault is located.

20. The arrangement according to claim 15, wherein said electrical stimulus generator is operative to apply said wideband signal to an open connection between said DSL line card and said wireline, and said DSL line card measurement unit is operative to generate a first set of tap coefficients of said echo cancellation operator in accordance with the measured reflection response to said wideband signal applied to said open connection to said wireline, and wherein said electrical stimulus generator is thereafter operative to apply said wideband signal to a closed connection between said DSL line card and said wireline, and said line card measurement unit is operative to generate a second set of tap coefficients of said echo cancellation operator in accordance with the measured reflection response of said wideband signal to said closed connection to said wireline, and wherein said processing unit is operative to process said first and second sets of tap coefficients to determine in which portion of said wireline said fault is located.

21. The arrangement according to claim 20, wherein said processing unit is operative to combine said first and second sets of tap coefficients of said echo cancellation operator in a manner that produces a time-domain amplitude response, and to determine in which portion of said wireline said fault is located in accordance with the peak of said time-domain amplitude response.

22. The arrangement according to claim 14, wherein said DSL line card measurement is operative to generate a first set of tap coefficients of an echo cancellation operator in accordance with the measured reflection response of said wireline to said wideband signal for a no fault condition of said wireline, and thereafter to generate a second set of tap coefficients of said echo cancellation operator in accordance with the measured reflection response of said wideband signal for a fault condition of said wireline, and said processing unit is operative to process said first and second sets of tap coefficients to determine in which portion of said wireline said fault is located.

23. The arrangement according to claim 21, wherein said processing unit is operative to process said first and second sets of tap coefficients of said echo cancellation operator in a manner that produces a time-domain amplitude response, to determines in which portion of said wireline said fault is located in accordance with the peak of said time-domain amplitude response.

24. The arrangement according to claim 14, wherein said processing unit is operative to adjust a determination of in which portion of said wireline said fault is located, in accordance with a known location of a bridged-tap in said wireline.

25. The arrangement according to claim 14, wherein DSL line card measurement unit is configured to compensate for unwanted voltage influences on said wireline.

26. A method comprising:
  (a) conducting electrical measurements upon a wireline from a digital subscriber loop (DSL) line card installed at a central office facility;
  (b) reporting results of said electrical measurements conducted in step (a) to a processing unit separate from said DSL line card; and
  (c) processing said results of said electrical measurements reported in step (b) at said processing unit to determine which portion of said wireline contains a fault: and wherein
  step (a) comprises stimulating said wireline to establish attributes of a digital echo canceler, step (b) comprises transmitting information representative of said attributes of said digital echo canceller to said processing unit, and step (c) comprises analyzing said attributes of said digital echo canceler to derive a measure of distance from said DSL line card to said fault: and wherein
  said attributes of said digital echo canceler correspond to tap coefficients thereof.

27. The method according to claim 26, wherein step (c) comprises determining whether said fault is located within said central office facility, between said central office facility and a remote location serving subscriber equipment, or within said remote location, and generating a message that associates a service technician appropriate for the identified location.

28. The method according to claim 26, wherein step (c) comprises processing said results of said electrical measurements reported in step (b) to provide a measure of distance from said DSL line card to said fault.

29. The method according to claim 1, wherein step (c) is carried out by a processor in an equipment installation containing said line card.

30. The method according to claim 1, wherein step (c) is carried out by a processor in an equipment installation separate from that containing said line card.

31. The method according to claim 1, wherein step (a) includes the precursor step of examining the communication capability of said line card over said wireline to said remote location and, in response to said communication capability satisfying a prescribed criterion, preventing application of said electrical stimulus to said wireline from said central office facility, and also deferring steps (b) and (c).

* * * * *